United States Patent [19]

Chasey

[11] 4,073,472
[45] Feb. 14, 1978

[54] ARTICULATED DISC VALVE
[75] Inventor: Henry G. Chasey, Pittsburgh, Pa.
[73] Assignee: Koppers Company, Inc., Pittsburgh, Pa.
[21] Appl. No.: 756,591
[22] Filed: Jan. 4, 1977
[51] Int. Cl. .............................................. F10k 31/54
[52] U.S. Cl. .................................. 251/229; 251/250; 74/31
[58] Field of Search ............... 251/228, 229, 231, 232, 251/250, 279, 304, 305, 160, 163, 298; 74/31

[56] References Cited
U.S. PATENT DOCUMENTS

| | | | |
|---|---|---|---|
| 732,567 | 6/1903 | Lasher | 251/229 |
| 761,173 | 5/1904 | Howe | 74/31 |
| 993,806 | 5/1911 | Taylor | 251/250 |
| 2,081,842 | 5/1937 | Sharp | 251/250 |
| 2,443,036 | 6/1948 | Hopkins | 251/228 |
| 2,481,293 | 9/1949 | Cooney | 251/250 |
| 2,974,921 | 3/1961 | Kaswan | 251/250 |
| 3,307,573 | 3/1967 | Epstein | 251/298 |
| 3,477,690 | 11/1969 | Murota et al. | 251/163 |

Primary Examiner—Martin P. Schwadron
Assistant Examiner—G. L. Walton
Attorney, Agent, or Firm—R. Lawrence Sahr; Oscar B. Brumback

[57] ABSTRACT

A flow line valve containing an articulated disc, operated by means of a lever actuating mechanism and articulated by the combination of a guide with a rack and pinion gearing system, is disclosed. A valve disc is mounted in a valve body and is operated by rotary motion applied to a crankshaft, through a crank lever and a linking means, which in turn exerts a linear force on the valve disc. The valve disc is initially moved in relation to the seat in a longitudinal direction, directed by a guide means, which is then translated into a pivotation of the disc controlled by a rack and pinion system, such that the valve disc is first longitudinally retracted from the valve seat and then pivoted, clear of the valve seat, 90° to an open position, concurrent with further retraction of the valve seat. Closure is effected by reversing the sequence of articulation.

8 Claims, 5 Drawing Figures

CLOSED POSITION

OPEN POSITION

ARTICULATED DISC VALVE

BACKGROUND OF THE INVENTION

1. Field of the Invention

This invention relates to disc-type valves as used, inter alia, in industry to control the flow of gaseous and fluid materials in pipelines.

2. Description of the Prior Art

In the known disc-type valves, the sequence of opening and closing of the valve is accomplished entirely by means of various arrangements of levers, both with and without some means of guiding the motion of the valve disc in relation to the valve seat. Disc type valves utilizing a guide means in addition to a lever action provide a means of positive control of the motion of the valve disc at all points in its travel, whereas designs using merely the lever principle only generally direct the opening and closing of such a valve without benefit of precise control. The guide means used in known valves of this type incorporate various designs which only add additional lever actions. For the longitudinal movements of the valve disc, control by such lever actions is satisfactory. Problems develop at the point where the disc must be pivoted to insure minimal restriction to material flow through the valve. Specifically, the problems develop where these types of valves are used in applications wherein there is a significant degree of operational temperature variation. Due to different degrees of expansion and contraction of the masses of material of the component elements, the geometry of articulation changes. The result is a tendency for the lever actions, at certain temperatures, to bind at the point where the disc is to be pivoted. There is a need to provide a means by which such binding can be overcome, thus insuring a positive pivotation of the valve disc through the range of operating temperatures of the valve.

In the known disc type valves, there is reliance, to some degree, on the force of gravity to articulate the valve disc. Therefore, these valves cannot be operated in positions other than that for which they are designed. There is a need for a standard articulation mechanism for disc type valves used at elevated temperatures which does not depend on gravity but can be used equally as well in any position. Such a standard articulation mechanism would reduce the cost of manufacturing valves of this type by reducing the number of different designs required to produce valves for all of the possible variations in position in which such valves are used.

SUMMARY OF THE INVENTION

The present invention is directed primarily to an improvement in disc-type valves wherein the motion of a valve disc in the disc-type valve, operating on the lever principle, is directed and controlled, such that the valve disc is positively guided away from the valve seat and then positively pivoted at a point where the valve disc's pivotal arc is entirely clear of the valve seat.

The butterfly valve includes a valve body having as an integral part therein a valve seat positioned perpendicular to the axis of the valve body. A valve disc is mounted in the valve body in a position whereby the peripheral face of the valve disc is adjacent to, and in full contact at all points with, the valve seat when in the closed position. A crankshaft is pivotally mounted to the valve. Any one of a number of different commercially available means of rotation is engaged to one end of the crankshaft. A plurality of crank levers are fixed to the crankshaft such that rotation of the crankshaft will cause the extreme ends of the crank levers to oscillate. The extreme ends of the crank levers are pivotally connected to link members, which in turn are pivotally connected to a pivot shaft. The pivot shaft is fixed to a valve disc. The ends of the pivot shaft extend beyond the periphery of the valve disc and through longitudinal guides positioned on the wall of the valve body, which serve to direct the motion of the valve disc. The guides firstly direct linear retraction of the valve disc from the valve seat as the valve is opened. At a point where the valve disc can be pivoted clear of the valve seat, gears fixed to the ends of the pivot shaft engage racks within the guides, causing the pivot shaft to rotate thus pivoting the valve disc. rotation of the pivot shaft one quarter turn causes the valve disc to rotate 90°, fully opening the valve. The valve is closed by reversing the direction of rotational force applied to the crankshaft, thus reversing the direction of motion and the sequence of operation of the valve.

Accordingly, one of the principal features of the present invention is to provide a disc-type valve wherein the mechanism by which the articulation of a valve disc can be accomplished at elevated and differential temperatures, thus overcoming the tendency to bind found in valves operated solely by lever mechanisms.

Another feature of the present invention is the ability of the valve to be operated in all positions, controlled by mechanical force and motion not dependent on gravitational forces.

These and other features of the present invention will be more completely disclosed and described in the following specification, the accompanying drawings and the appended claims.

DETAILED DESCRIPTION

Figure 1:
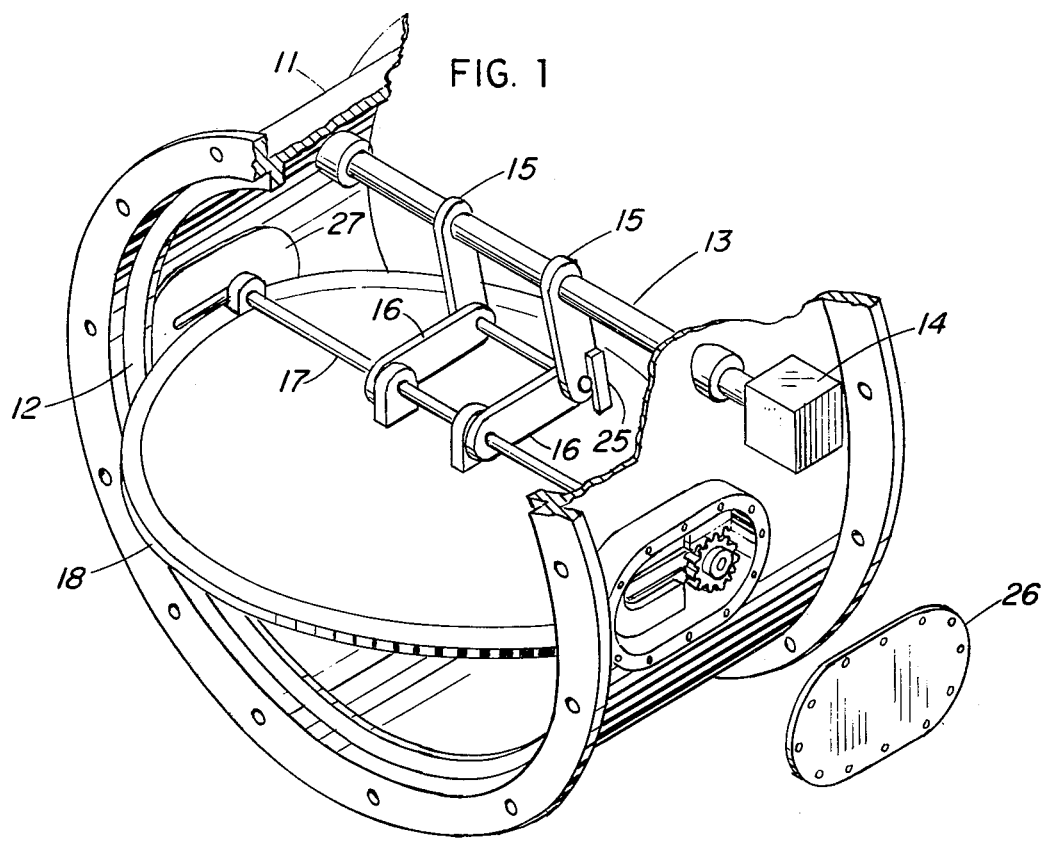
FIG. 1 is an isometric view of the valve in the open position with a section removed to show the internal arrangement of the operating mechanism.

In the preferred embodiment of the present invention, referring to the drawings, there is illustrated a disc-type valve comprised of a cylindrical valve body 11. A valve seat 12, is fixed integrally into the cylindrical circumference of the valve body 11 and perpendicular to the central axis of that valve body 11. A crankshaft 13 is pivotally mounted within the valve body 11, perpendicular to the central axis of the valve body 11 and intersecting the cylindrical section of the valve body 11 on a secant plane, as illustrated in FIG. 1. One end of the crankshaft 13 protrudes beyond the valve body 11 and is engaged with a commercially available means of rotation, generally designated by the numeral 14, as illustrated in FIG. 1. Referring to FIG. 1, two crank levers 15 are positioned within the valve body 11, and fixed by their ends, to the crankshaft 13. Each crank lever 15 is pivotally connected, at its other end, to a link member 16. The opposite end of each link member 16 is pivotally connected to a pivot shaft 17. The pivot shaft 17 is fixed to a valve disc 18.

Figure 2:
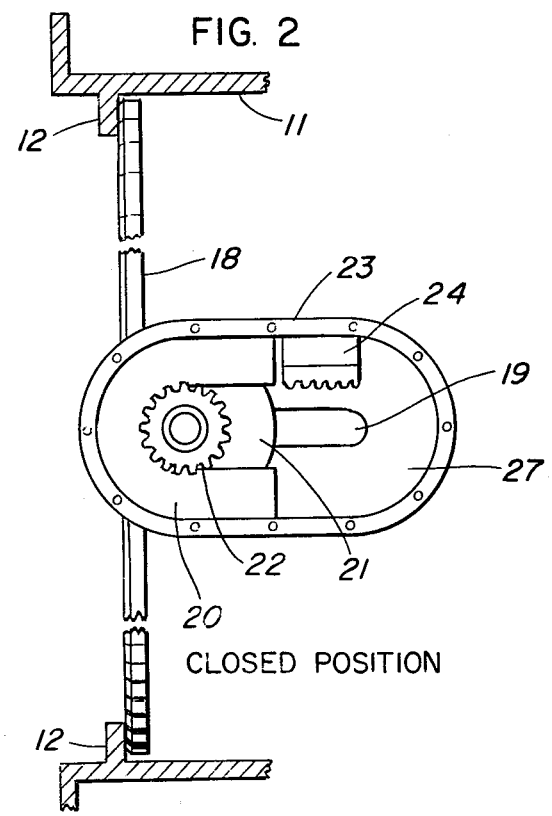
FIG. 2 is a view of the guide means from the left side of the valve, with the valve in the closed position, including a depiction of the position of the valve disc and its relation to the valve seat at the closed position.
Figure 3:
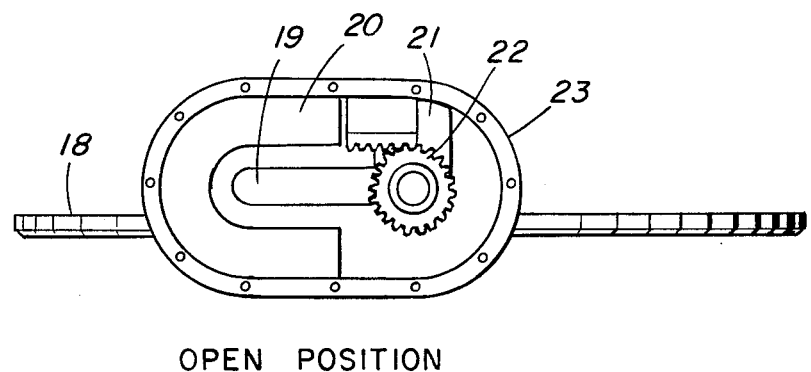
FIG. 3 is a view of the guide means from the left side of the valve, with the valve in the open position, including a depiction of the position of the valve disc.
Figure 4:
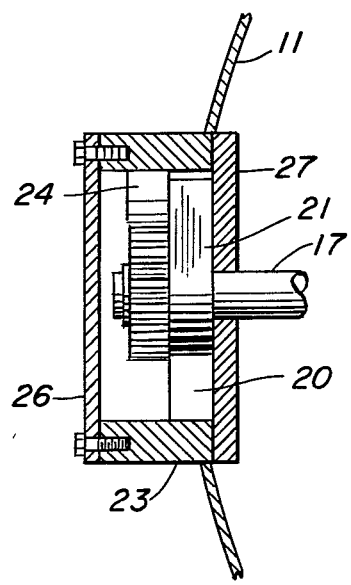
FIG. 4 is a sectional view of the left side guide means as viewed from the rear of the valve.
Figure 5:
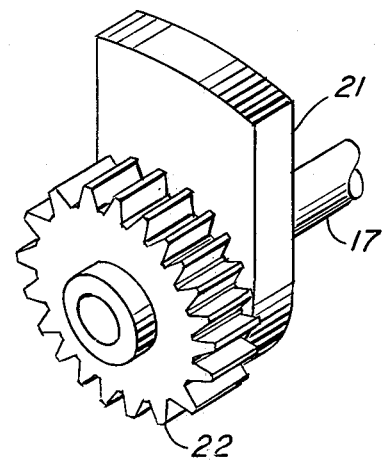
FIG. 5 is an isometric view of the relation to the pivot shaft of a gear and a guide key.

The pivot shaft 17 is of such length as to extend beyond the periphery of the valve disc 18 and through slotted apertures 19 in plates 27 fixed to the walls of the valve body 11, one each for each end of the pivot shaft 17, as illustrated in FIG. 4. The slotted apertures 19 are positioned longitudinally parallel to the central axis of the valve body 11. The two plates 27 are mounted on opposite sides of the valve body 11. A guide track 20 is mounted, one on each plate 27, adjacent to each end of the pivot shaft 17, as shown in FIG. 2 and FIG. 3. Each guide track 20 is longitudinally parallel to its corresponding slotted aperture 19, forming an elongated "C" about the frontal end of that slotted aperture 19. The distance separating the legs of the elongated "C" formed by the guide track 20 is greater than the width of its corresponding slotted aperture 19, as shown in FIG. 3. A guide key 21 is fixed to each end of the pivot shaft 17 beyond the corresponding slotted aperture 19, as shown in FIG. 4. Each guide key 21 fits into the interior of the elongated "C" that is formed by the guide track 20, as shown in FIG. 2. One end of each guide key 21 is semicircular, corresponding to the semicircle formed by the interior of the "C" of the corresponding guide track, while the sides of the guide key 21 are squared so as to allow motion of the guide key 21, in the guide track 20, only in a linear direction, as shown in FIG. 2. Outboard from each guide key 21, a gear 22 is fixed to each end of the pivot shaft 17, as shown in FIG. 5. Each gear 22 is positioned, in relation to its corresponding guide track 20, such that it will not engage that guide track 20, but is adjacent to it, as shown in FIG. 4. A frame, generally designated by the numeral 23, oblong in shape, surrounds each guide track 20 and its corresponding slotted aperture 19 and is fixed to the adjacent exterior wall of the valve body 11 and the corresponding plate 27, as shown in FIG. 4. Fixed to each frame 23 and longitudinally aligned with each gear 22 is a rack 24 positioned such that each gear 22 will engage its corresponding rack 24 at the point where the guide keys 21 leave the terminal ends of the guide tracks 20, as the pivot shaft 17 traverses the slotted apertures 19, as shown in FIG. 2 and FIG. 3. A cover 27 is bolted to each frame 23 to seal the valve.

Starting from a position in which the periphery of the valve disc 18 is positioned against the valve seat 12 and the valve is thus closed, as shown in FIG. 2, the means of rotation 14 applies a rotary force to the crankshaft 13 which, in turn, urges the crank levers 15 to oscillate in a direction away from the valve seat 12. This oscillation draws the link members 16 in a linear direction away from the valve seat 12, causing the pivot shaft 17 and the valve disc 18, in turn, to move away from the valve seat 12. The motion of the valve disc 18 is controlled by the engagement of the guide keys 21 in the guide tracks 20 such that the valve disc 17 is retracted from the valve seat 12 without pivotation until the guide keys 21 reach the terminal ends A of the guide track 20. At this point A a transition in motion occurs. The guide keys 21 are disengaged from the guide tracks 20 concurrent with the engagement of the gears 22 and their corresponding racks 24. Further linear retraction of the valve disc 18 causes the valve disc 18 to pivot as the gears 22 are rotated by their engagement with the racks 24 resulting in a full 90° pivotation of the valve disc 18 about the pivot shaft 17, as shown in FIG. 3. At the point where the valve disc is pivoted a full 90° from its original closed position, as shown in FIG. 3, the means of rotation 14 is halted as the valve disc 18 contacts a stop 25 fixed to each crank lever 15, as shown in FIG. 1. At this point the valve is fully open.

Starting at the fully open position, the valve is closed by reversing the sequence of the opening forces and motions. The means of rotation 14 directs a rotary force to the crankshaft 13, opposite to that required to open the valve. The crankshaft 13 is rotated in the direction of rotation, oscillating the crank levers 15 in a direction opposite to that found in opening the valve. The oscillation of the crank levers 15 pushes the link members 16 toward the valve seat 12 which, in turn, forces the valve disc 18 and the pivot shaft 17, linearly, towards the valve seat 12. As the pivot shaft 17 is linearly moved toward the valve seat 12, the gears 22, engaged with their respective racks 24, cause the valve disc 18 to pivot 90° in a direction reverse to that of the opening sequence thus aligning the guide keys 21 with the guide tracks 20. As the gears 22 reach the ends of the racks 24, the guide keys 21 enter the guide tracks 20, followed by disengagement of the gears 22 from the racks 24. At this point, the terminal ends A of the guide tracks 20, the valve disc 18 is pivoted in reverse a full 90°. The guide keys 21 now slide toward the initial ends of the guide tracks 20, forcing the periphery of the valve disc 18 against the valve seat 12 thus fully closing the valve, as shown in FIG. 2.

According to the provisions of the patent statutes, what is considered to represent the best embodiment of the present invention, its preferred construction and its best mode of operation have been illustrated and described. However, it is to be understood that, within the scope of the appended claims, the invention may be practiced otherwise than as specifically illustrated and described.

What is claimed is:

1. A valve for use in a flow line, for controlling the flow of material, comprising:
   a. a valve body;
   b. a valve seat mounted to the internal periphery of said valve body;
   c. a valve disc pivotally mounted within said valve body contiguous to said valve seat whereby said valve is closed;
   d. a pivot shaft fixed to said valve disc perpendicular to the central axis of said valve body;
   e. a crankshaft pivotally engaged with said valve body parallel to said pivot shaft;
   f. a crank lever fixed to said crankshaft and perpendicular thereto;
   g. a link member pivotally connected to the free end of said crank lever at one end, the second end being pivotally connected to said pivot shaft;
   h. a plurality of slotted guide means, mounted on opposite walls of said valve body, said slots running parallel to the central axis of said valve body and positioned to engage the ends of said pivot shaft;
   i. means of directing unilateral motion of said pivot shaft from the closed position of said valve to a point in said slots of said guide means at which said valve disc can be pivoted clear of said valve seat;

j. a plurality of gears fixed to said pivot shaft adjacent to said guide means; and k. a plurality of racks aligned with said gears positioned so as to engage said gears at all points along said slots in said guide means wherein said valve disc can be pivoted clear of said valve seat.

2. A valve as recited in claim 1 further comprising a means of rotation engaged to said crankshaft.

3. A valve as recited in claim 1, in which the means of directing unilateral motion of said pivot shaft from the closed position of said valve to a point in said slots of said guide means at which said valve disc can be pivoted clear of said valve seat comprises;

a. a plurality of guide tracks fixed to said guide means, forming key ways larger in width than said slots in said guide means, positioned about said slots in said guide means; and b. a plurality of guide keys, sized to fit said key ways formed by said guide tracks, fixed to the ends of said pivot shaft, and positioned to ride in said key ways to all positions of said pivot shaft, engaged in said slots in said guide means, wherein said valve disc cannot be pivoted clear of said valve seat.

4. A valve as recited in claim 1 in which the plurality of slotted guide means comprise plates with slotted apertures cut into them.

5. A valve as recited in claim 1 in which the plurality of slotted guide means are two in number mounted, one each, on the exterior of the opposite walls of said valve body, said pivot shaft extending through said opposite exterior walls of said valve body and through said slots in said guide means.

6. A valve as recited in claim 5 in which the slotted guide means are plates with slotted apertures cut into them.

7. A valve as recited in claim 6 in which the means of directing unilateral motion of said pivot shaft from the closed position of said valve to a point in said slots of said plates at which said valve disc can be pivoted clear of said valve seat comprises:

a. two guide tracks, one each fixed to each said plate, forming key ways larger in width than said slotted apertures in said plates, positioned about said slotted apertures in said plates; and b. two guide keys, one each fixed to each end of said pivot shaft, sized to fit said key ways formed by said guide tracks, one each fixed to each end of said pivot shaft, and positioned to ride in said key ways at all positions of said pivot shaft wherein said valve disc cannot be pivoted clear of said valve seat.

8. A valve as recited in claim 7 further comprising a means for sealing said slotted apertures in said plates to prevent leakage.

* * * * *